United States Patent [19]

Greene

[11] 4,282,261

[45] Aug. 4, 1981

[54] BEVERAGE FILTRATION PROCESS

[75] Inventor: James T. Greene, Middletown, Conn.

[73] Assignee: AMF Incorporated, White Plains, N.Y.

[21] Appl. No.: 202,389

[22] Filed: Oct. 30, 1980

Related U.S. Application Data

[63] Continuation-in-part of Ser. No. 65,258, Aug. 9, 1979, abandoned.

[51] Int. Cl.$^3$ ............................................... C12H 1/04
[52] U.S. Cl. ................... 426/330.4; 210/734; 210/736; 210/777; 426/330.5; 426/423; 426/490
[58] Field of Search ................. 260/29.2 EP; 426/11, 426/12, 330, 330.3, 330.4, 330.5, 271, 422, 423, 495, 490; 210/666, 679, 734–736, 764, 777, 797, 798, 806, 504, 505, 508

[56] References Cited

U.S. PATENT DOCUMENTS

| | | | |
|---|---|---|---|
| 2,872,321 | 2/1959 | Walles et al. | 426/330.3 |
| 2,926,154 | 2/1960 | Keim | 260/29.2 EP |
| 3,878,300 | 4/1975 | Milligan | 426/422 |
| 3,958,023 | 5/1976 | Butterworth | 426/330.4 |
| 4,008,339 | 2/1977 | Matsuda et al. | 426/330.4 |
| 4,045,377 | 8/1977 | Pearson | 260/29.2 EP |
| 4,073,954 | 2/1978 | Mobius | 426/330.3 |
| 4,166,141 | 8/1979 | Westermann et al. | 426/330.4 |
| 4,177,295 | 12/1979 | Kubanek et al. | 426/330.3 |
| 4,238,334 | 12/1980 | Halbfoster | 210/777 |

*Primary Examiner*—Ivars C. Cintins
*Attorney, Agent, or Firm*—George W. Price; Michael Zall

[57] ABSTRACT

A beverage stabilization process in which unstable beverages are contacted in a haze-free condition and at ambient temperature with positive-charge modified particulates, especially in the form of filter sheets, to initiate haze formation and the thus-formed haze is thereafter removed from the beverage at ambient temperature thereby resulting in the stabilization of the beverage.

15 Claims, No Drawings

BEVERAGE FILTRATION PROCESS

CROSS REFERENCE TO RELATED APPLICATION

This application is a continuation-in-part of commonly assigned U.S. patent application Ser. No. 065,258, filed Aug. 9, 1979, now abandoned.

BACKGROUND OF THE INVENTION

1. Field of the Invention

This invention relates to processes for preventing haze development in alcoholic and fruit beverages and, more particularly, to processes for removing haze precursors from such beverages by treatment with positively-charged media.

2. Description of the Prior Art

The development of haze in alcoholic and fruit beverages has long been a distinct problem. Development of haze in beverages is, of course, undesirable from the viewpoint of product aesthetics and eye-appeal. In addition, haze development can result in loss of product color as well as taste notes. Solution of this problem has been attempted by several different approaches. The most commonly employed method for coping with the haze problem in alcoholic beverages has been a procedure of reducing the temperatures of the beverage, e.g., beer, wine, whiskey, fortified wine products (sherry, brandy and cognac), rum, certain white and red wines, liquors and cordials, to cause haze formation at temperatures below about 45° F. and most commonly at between about 20° and 30° F. During such chilling, the haze precursors apparently separate out as the so-called "haze" which can be then separated using known techniques such as filtration. In many cases, such treatment by chilling is not completely effective and several chilling and precipitation treatments may prove necessary. As an alternative to chill processing, attempts have been made to determine the amount of the precursors of haze in the grains employed in the production of specific beverages, e.g., by extraction of the malt employed in the production of beer. As a result of such determinations, grains of low haze-precursor content can be selected to produce beverages of low potential haze. Such procedures are costly and time-consuming. Although this approach can result in amelioration of the haze problem, it rarely can result in elimination thereof.

The haze problem has been investigated quite extensively but the exact nature of the haze has not been established. In beer, the formation of haze is attributed to the presence of phenolics as described, for example, in *MBAA Technical Quarterly*, Vol. 14, No. 4, 1977, p. 250, "Complex Phenols in Brewing—A Critical Survey" by R. J. Gardner and J. D. McGuinness, and *The Brewers Digest*, April, 1978, p. 36, "Determination of Phenolic Compounds in Beer and Brewing Materials" by Miroslar Dadic. In some whiskeys, haze is attributable to the presence of steroids which precipitate on chilling.

In fruit beverages, the haze problem has been treated primarily through the use of enzymes which hydrolyze the proteins which normally form haze with the phenolic components of the fruit preparation. Such beverages include, for example, apple, cranberry, grape, citrus fruit, peach, pear, plum, apricot and nectarine juices.

U.S. Pat. No. 3,958,023 to Butterworth describes a method for removing haze forming substances present in beer whereby a "chill control agent," e.g., polyvinylpyrrolidone, is added to a beer which, after a period of resting or aging at reduced temperature, e.g., five days to three months at temperatures of from about 30° to 32° F., is filtered to remove the chill control agent with the haze forming substances absorbed thereon. The requirement that the Butterworth liquid be in a chilled or refrigerated state prior to filtration prior to removal of the haze-forming components therefrom is clearly disadvantageous when it is considered that significant quantities of energy must be consumed in reducing the temperature of the liquid, in this case beer, to the level necessary for effective operation.

For the purpose of this disclosure, beverages to be treated in accordance with the invention are those derived from vegetable origin which form a haze on standing and/or chilling, i.e., are defined as unstable beverages. After treatment in accordance with the invention, the beverages form little, if any, haze under storage or chilling at the very least. The tendency towards haze formation is reduced as a result of treatment by the present process.

SUMMARY OF THE INVENTION

This invention provides a process for treating unstable beverages as defined herein, with a sanitizable or sterilizable charge-modified high-surface area medium to initiate haze formation in unstable beverages, especially alcoholic beverages, at ambient temperature. After formation, the haze can be removed, again, at ambient temperature, by conventional methods such as by filtration using art-recognized processes.

The step for forming the haze can be repeated as often as required, for example, several times, to ensure that the beverage is stabilized, i.e., will not develop haze on cooling or prolonged standing, although normally one such contact step is all that is required to attain reasonable stability.

In one embodiment of the invention, the charge-modified, high-surface area medium is in the form of a filter medium through which the selected beverage is passed at ambient temperature in a suitable filter device. As the beverage passes through the filter medium, haze becomes evident in the effluent beverage which can thereafter be filtered while still at ambient temperature using conventional filtration means. In a preferred form, the filtering device is fitted with one or several additional filtering media downstream of the first filter medium to filter the haze formed when the beverage passes through the first filter medium. the additional filter media can be any of the conventionally employed filters known to the art, e.g., acid-treated asbestos.

Thus, by use of the present invention, the haze problem in unstable beverages can be substantially eliminated employing relatively simple and economical procedures which readily tend themselves to incorporation during ordinary processing of the beverages treated. For example, filtration steps are commonly employed in beer and wine production and it is possible to incorporate the present process into the normal filtration processing of these beverages by providing the requisite charge-modified, high-surface area medium to the filtration system in a form adapted to the particular filtration system employed. Unlike the beer filtration system in U.S. Pat. No. 3,958,023 to Butterworth, supra, the haze filtration process herein requires no reduction in temperature of the liquid to which the haze formationinitiating agent is added, either to induce haze formation and/or to facilitate subsequent filtration.

The present invention can be used as the sole means for removal of haze, or alternatively can be used along with other known methods of haze removal. Thus, a combination of chill treatment and contact treatment in accordance with the invention can be used either as separate steps or simultaneously.

The charge-modified, high-surface area media to be employed in the present invention are comprised of fine particulates, such as diatomaceous earth and perlite, modified with polyamido-polyamine epichlorohydrin cationic resin. The fine particulates are advantageously supported in a fiber system in the form of filter medium, preferably in the form of sheets formed from the filter medium.

In accordance with this preferred form of the present invention, charge modified filter media sheets are prepared utilizing in sheet formation a fiber system for the self-bonding media matrix incorporating beaten cellulose fibers, usually a moderately to highly beaten pulp, to provide a fiber system having a Canadian Standard Freeness of 100–600 ml. preferably 200–300 ml. or less. The provision of shorter or more fibrillated fiber permits the retention of fine particulates ranging in the preferred embodiments upwards of 50 percent up to 70 percent or more by weight of the sheet.

The charge modifier selectively employed for the preparation of sanitizable or sterilizable filter media is a polyamido-polyamine epichlorhydrin cationic resin which resists degradation in such treatment and retains positive charge potential. Thus, sterilizable filter media may be formed which are non-toxic, exhibit less than 1.5% extractables and are efficacious in use despite autoclaving conditions of e.g., 130° C. under 15 lb. pressure for 1 hour or hot water flushing at 180° F. for 1 hour at a flow rate of 225 cc/min.

The filter media sheet, preferably formed by vacuum felting of a cationically disperse aqueous slurry comprising beaten cellulose fibers and fine particulate shows a uniform, high porosity, and fine pore size structure with excellent filtration and flow characteristics.

It will be understood that charge-modified fine particulates in accordance with the present invention can be used in art-recognized methods to provide the necessary contact of the unstabilized alcoholic beverage with the said particulates such as the usual filter bed made up of the particulate matter. However, the invention will be described in terms of the preferred embodiment which employs sheet filter media.

The results obtained with the positively-charged media of the present invention are indeed surprising and unexpected in view of the results obtained with other positively-charged media. For example, comparable filter media comprised of cationic colloidal silica as a charge modifier have been used in an attempt to stabilize alcoholic beverages and the results obtained indicate non-uniform results, with considerably less effectiveness than obtained with the present media. When the charge modifier is cationic melamine-formaldehyde no haze formation occurs.

Since the invention is particularly suitable for stabilizing so-called "unstable" alcoholic beverages, it will be described in terms of such beverages in which the lack of stability is a particularly insidious problem. It should be understood that the invention is also applicable to fruit juices and other similarly unstable liquid products.

DETAILED DESCRIPTION OF THE INVENTION

The filter media sheets of the invention are prepared from cationically modified filter elements, usually in the form of a cationically disperse aqueous slurry comprising cellulose fiber and optimized levels of fine particulate such as diatomaceous earth or perlite. The filter elements may be cationically modified in the slurry and the sheet prepared dynamically by vacuum felting, and drying, or the filter elements may be pretreated and formed into sheet media. A special feature of the invention is the provision of filter media sheet in which the level of particulate retained is enhanced as compared to sheet prepared conventionally.

The state of refinement of a wood pulp fiber is determined by means of a "freeness" test in which measurement as the flow rate through a forming pad of the fibers on a standard screen is determined, most commonly utilizing the "Canadian Standard Freeness Tester." In this method, the quantity which is measured is the volume of water (expressed in ml.) which overflows from a receiver containing an orifice outlet at the bottom. The Canadian Standard Freeness measurements are employed in the present specification. Coarse unbeaten wood pulp fibers produce high drainage rates into the receiver from the screen resulting in large overflow volumes, and hence record a high freeness. Typical wood pulps show Canadian Standard Freeness values ranging from +400 ml. to +800 ml. In paper or filter media manufacture such pulps may be subject to mechanical refining processes such as beating, which tends to cut and/or fibrillate the cellulose fibers. Such beaten fibers exhibit slower drainage rates, and, therefore, lower freeness.

In accordance with the present invention, such beaten pulp is employed in the self-bonding matrix for the filter media. The Canadian Standard Freeness of the pulp system will vary with pulp selection, and may be reflective of varying states of subdivision or refinement, as where different pulps or differently beaten pulps are combined for sheet formation, but the beaten pulp will be employed to provide a composite or average value ordinarily ranging from 100 to 600 ml., with lower values, e.g., 200–300 ml. or less being preferred for higher solids retention.

The wood pulp may comprise as little as 10 percent by weight with up to 20 to 30 percent, by weight of the total, being preferred to provide filter media sheet with structural characteristics suitable for industrial filtration applications.

The amount of fine particulate in the filter media sheet is dependent to some extent on the performance requirements. While as little as 10 percent of a fine particulate will suffice for many purposes, optimum performance is achieved by utilizing the maximum amount of fine particulate. For industrial filtration, structural characteristics suggest a practicable maximum of about 70 percent by weight. Of course, for less demanding applications, somewhat higher levels will be possible. Generally, levels of 50–70 percent by weight are employed.

There are various types of fine anionic particulates that are suitable for the intended purpose, including diatomaceous earth, perlite, talc, silica gel, polymeric particulates such as those produced by emulsion or suspension polymerization, e.g., polystyrene, polyacrylates, poly(vinyl acetate), polyethylene, (or other such materials as described in Emulsions and Emulsion Technology, Lissant, Kenneth J., Marcel Dekker, 1974) activated carbon, molecular sieves, clay, etc. Functionally, the fine particulate should have a specific surface area in excess of one square meter/gram and/or particulate diameters of less than 10 microns. In a broad sense, any fine particulate may be suitable (such as J.M. Filter Cel, Standard Super Cel, Celite 512, Hydro Super Cel, Speed Plus and Speedflow; Dicalite 215 and Dicalite 416 and Dicalite 436) and may be evaluated by techniques well-known to the art. From the standpoint of size, morphology, cost, fluid compatibility and general performance characteristics, the finer grades of diatomaceous earth and perlite filter aids exhibiting a mean particulate size of less than 5 microns are preferred. In many cases, mixtures of more than one type of fine particulate such as diatomaceous earth/perlite for example, in proportion by weight of from about 80/20 to 20/80 give better filtration performance or better cost/performance characteristics than that achieved by the use of any single type by itself. Similarly, mixtures in all proportions of relatively coarse and fine particulates, e.g., 50/50 parts by weight of 10 and 5 micron diameter particulates may be used.

Suitable polyamido-polyamine epichlorhydrin cationic resins are those of U.S. Pat. Nos. 2,926,116; 2,926,154; 3,224,986; 3,332,901 and 3,382,096 incorporated herein by reference and may be produced by reacting a dicarboxylic acid with a polyamine dimer to form a water soluble polymer which is further reacted with epichlorhydrin. The dimer unit may have the general formula:

$$H_2N\ [(CH_2)_2-NH]_{\overline{x}}(CH_2)_2-NH_2$$

where x is an integer of 1 to 7, and the dicarboxylic acid may be aromatic or aliphatic such as adipic, azelaic, diglycolic, oxalic or malonic acids. The cationic charge is induced through the amine function in tertiary or quaternized configuration. Other suitable charge modifying resins, employing a heterocyclic dicarboxylic acid reactant are disclosed in U.S. Pat. No. 3,761,350. The polyamido-polyamine epichlorhydrin cationic resins are available commercially, as Polycup 1884, 2002 or S2064 (Hercules); Cascamide Resin pR-420 (Bordon); or Nopcobond 35 (Nopco).

In paper production, where cationic charge modifiers are sometimes used, the objective is reduction of charge to approximately the isoelectric point to maximize efficiency in interfelting of fiber. For filtration, maximum charge is desired to enhance removal of charged particles by electrokinetic mechanisms. In the present case the surface charge of at least one of the negatively charged filter elements i.e., cellulose and particulate is reduced to render the surface less electronegative and optionally (and preferably) reversed by the deposition of sufficient cationic charge modifier to render the surface electropositive, to provide at least certain electropositive regions or sites within the filter sheet. In order to accomplish charge reversal, of course, one proceeds through the isoelectric point, and then positive charge buildup is accomplished to the maximum practical level.

The amount of charge modifier employed in the present invention is thus preferably that sufficient to at least provide a cationically disperse system i.e., a system in which no visible flocculation occurs at ambient conditions in the absence of applied hydrodynamic shear forces. The system therefore comprises essentially discrete fiber/particulate elements exhibiting a positive charge or zeta potential relatively uniformly or homogeneously distributed in and throughout the aqueous medium. The specific level will, of course, vary with the system and the modifier selected but will be readily determined by one skilled in the art. For example, the inflection point on a plot of particulate retention vs. amount of charge modifier approximates the minimum level for better performance. Thus, a 2 percent level is appropriate for a polyamido-polyamine epichlorhydrin resin. Although additional modifier may be employed to advantage where desired, this level represents the best balance on a cost-performance basis. Premodified filter elements e.g., particulate precoated with charge modifier may of course be incorporated in any manner into filter sheets with similar results, and where a cationically disperse slurry is not employed, charge modification will be commensurately reduced by control of modifier levels.

The charge modification effected is demonstrable in measurements of surface zeta potential, and an improved filtration efficiency for negatively charged particles in liquid systems.

The slurry of pulp and particulates is formed in any suitable manner. The sequence of adding these components to water to form the initial slurry appears to be relatively unimportant. The consistency of the slurry will represent the highest possible for a practical suspension of the components, usually about 4 percent. The system is subjected to hydrodynamic shear forces as by a bladed mixer, and the charge modifier is then added to the slurry.

The shear level is not critical i.e., any otherwise suitable shear rate or shear stress may be employed having regard for available equipment, preferred processing times etc. but is selected and employed simply to break up the flocs and maintain the system in a dispersed condition during treatment. Of course, upon the formation of a cationically disperse slurry, the system is free of floc formation even in the absence of applied shear.

After charge modification, the slurry is diluted with additional water to the proper consistency required for vacuum felting sheet formation, ordinarily 0.5 to $2\frac{1}{2}$ percent, depending upon the type of equipment used to form the sheet, in a manner known to the artisan. The slurry is formed into a sheet and oven dried in standard manner. The performance of the sheet is related to the drying parameters and optimized conditions may reflect energy considerations or desired thermal history consistent with minimization of unnecessary exposure of elevated temperatures, especially as the decomposition or scorch point for the system is approached.

In accordance with a preferred embodiment of the invention, filter media sheets are formed from filter elements i.e., particulate and a self-bonding matrix of cellulose pulp at least one of which is charge modified, the pulp being a system incorporating beaten pulp to provide a Canadian Standard Freeness of up to 600 ml., preferably less than 300 ml. e.g., 100–200 ml. the charge modifier consisting of a polyamido-polyamine epichlorhydrin cationic resin, and being applied in a proportion to reduce electronegativity of the surface, preferably to achieve charge reversal beyond the isoelectric point, e.g., to an add-on level of about 2% by weight. Filter media sheets so prepared may be autoclaved, hot water flushed or otherwise treated at elevated temperature to sanitize or sterilize the structure.

For the purpose of the invention, it is sufficient to merely contact the selected unstablized beverage with the positively-charged particulates and the haze forms as a result of such contact. The temperature of the beverage at the time of contact with the positively-charged particulates will ordinarily be that of the ambient surroundings, e.g., from about 50° F. to about 75° F. Should the ambient temperature exceed the upper limit of this range, there may be tendency for the haze to reenter solution. In such a case, it may be necessary to cool the beverage to within the aforesaid temperature range to provide proper haze development. Some types of unstable beverages, particularly alcoholic beverages of relatively high proof, have a greater ability to retain the haze forming components in solution and can therefore tolerate a temperature at the time of contact with the positively charged particulates which lies at the lower end of the aforesaid range.

The manner of contact of the beverage and positively-charged particulates is not critical and is usually selected as a matter of convenience. For example, the most convenient method employs filter media, the preferred form of the described particulates, and contact is accomplished by merely passing the unstabilized beverage through the filter medium in a suitable filter device with haze forming in the beverage after passing through the medium. The formation of haze is usually completed within a short period after contact. For example, the haze is substantially completely formed within about a minute, and even less, after contact and can then be removed, e.g., by filtration using filters suitable to removal of the haze. If desired, haze formation can be allowed to proceed for long periods of time, even to 16–20 hours before filtration, but the increased amounts of haze formed are not significant so no advantage is realized by long standing. On the contrary, the more desirable would be shorter standing time for haze formation, usually for time periods of about one minute before final filtration of the haze to produce stabilized beverage.

Once formed, the haze is readily removed, again at ambient temperature, i.e., at or about the temperature at which haze formation was effected, employing filtration as hereinbelow described.

To assure beverage stability, particularly when treating large volumes of beverage, in particular on a continuous basis, the filtering system employed can include a series of the positively-charged filter media to provide successive contacts with the treated beverage and these media may optionally be separated by second filters to remove haze, resulting in successive exposures of the unstabilized beverage to the necessary contact step required by this invention. The number of such positively-charged media necessary to accomplish the required result can, of course, be readily determined by routine experimentation and will be determined in part by the rate of flow of the beverage through the positively-charged media in the series. For most purposes, a series of two such filter media should suffice to precipitate substantially all of the haze components. The maximize the effect of each, the filter media should be spaced to provide sufficient time for haze formation to occur after the beverage passes through each positively-charged medium, i.e., ½ to one minute during which most haze will have precipitated. The arrangement of successively-placed media can then be followed by suitable filter means to remove haze from the stabilized beverage which results. Filtration efficiency has been observed to increase with the use of filter media of relatively higher porosity and greater thickness.

Employing the positively-charged filter media in accordance with this invention, the unstabilized beverages form a more abundant and finer haze than obtained by the usual chilling processing. For example, using a preferred filter medium, the turbidity of an unstabilized beverage (blended whiskey) increases from about 2 NTU to 8 NTU on passing once through the medium at ambient temperature (65°–70° F.) whereas the same beverage, on chilling to 50° F., showed a turbidity of slightly more than 4 NTU. In both instances, final filtration through an asbestos filter gave liquid product of a turbidity of less than 1 NTU. The product stabilized in accordance with the invention showed remarkable long-term stability when compared with the chill-hazed product. Under accelerated conditions of storage, the latter showed twice the instability as measured by turbidity measurements.

The following examples further illustrate the invention.

The filter sheets useful for the present process are prepared in accordance with the following procedure: all sheets were prepared utilizing Weyerhauser Coho Kraft pulp, beaten to the levels indicated below, and Grefco Dicalite 416 Perlite, having a mean particle size of 3.9 microns.

The charge modifier employed in these runs was cationic polyamine-polyamide epichlorhydrin resin (Hercules Polycup 1884; about 100000 mol. wt.; about 150Å particle size).

The total input weight (bone dry basis) of the component materials was 80 grams, exclusive of charge modifier. A constant proportion of pulp (30 percent by weight, or 24 grams) and particulate (70 percent by weight, or 56 grams) was maintained. The components were added to water in a 1 liter polyethylene bucket, with strong agitation, to form an aqueous slurry at two percent consistency, and the charge modifier added. (The system was subjected to hydrodynamic shear by action of a Hei-Dolph stirrer (Polyscience Inc.), having 4 propeller blades, rotating at about 700 rpm on setting 2.) The slurry was subsequently diluted to 0.5 percent consistency and vacuum felted into a sheet ranging from about 0.160 to 0.200 inch thickness (depending upon retention) in a nine inch by twelve inch hand sheet apparatus utilizing a 100 mesh screen. The sheet was subsequently removed, dried in a static oven at 350° F. until constant weight was achieved, and the final weight recorded. Comparison of the final sheet weight with the total input material weight allowed determination of total solids retention in the sheet.

Using this procedure, the following filter sheets can be prepared. All sheets showed good flow characteristics.

TABLE I

| Sheet No. | Pulp Freeness (CSF) | Charge Modifier Content (Wt. %) | Solids Retention Percent |
|---|---|---|---|
| 1 | 660 | 2 | 73.8 |
| 2 | 660 | 2 | 74.5 |
| 3 | 660 | 2 | 88.5 |
| 4 | 520 | 2 | 86.1 |
| 5 | 520 | 2 | 86.9 |
| 6 | 400 | 2 | 96.1 |
| 7 | 400 | 2 | 86.9 |
| 8 | 320 | 2 | 87.2 |
| 9 | 320 | 2 | — |
| 10 | 200 | 2 | 98.2 |

TABLE I-continued

| Sheet No. | Pulp Freeness (CSF) | Charge Modifier Content (Wt. %) | Solids Retention Percent |
|---|---|---|---|
| 11 | 200 | 2 | 92.4 |
| 12 | 110 | 2 | 91.6 |
| 13 | 110 | 2 | 93.0 |

EXAMPLE 1

Blended whiskey was stabilized by treatment with activated carbon (1 lb. of carbon per 1000 wine gallons) and diatomaceous earth. It was filtered through a 4-inch disc using 10 psi of air pressure in a pressure vessel. The results obtained with 2 filter media (Filters 1 and 2) prepared in accordance with the present invention (sheet 12 in Table 1) are given below in TABLE II. Also included are the results with Filter 3 (a positively-charged filter medium in which as charge modifier is present cationic colloidal silica) and Filter 4 (a commercial filter medium consisting of diatomaceous earth, cellulose and acid-washed asbestos fibers).

TABLE II

| | Filter | | | |
|---|---|---|---|---|
| | 1 | 2 | 3 | 4 |
| Filtration time (sec.) | 38 | 90 | 75 | 23 |
| pH (initial = 4.1) | 4.3 | 4.3 | 4.5 | 4.6 |
| Color (KV) (initial = 85) | 55 | 33 | 59 | 75 |
| Turbidity (JTU) | 6.3 | 2.8 | .27 | .18 |
| Turbidity (after 24 hrs) | 6.5 | 2.8 | .33 | .19 |

When the procedure is repeated with a comparable filter using melamine-formaldehyde as charge modifier, haze formation does not occur.

EXAMPLE 2

The procedure of EXAMPLE 1 was repeated employing a Scotch whiskey. Filtration with Filter 1 gave a turbidity of 1.5 JTU and, after 24 hours, 2.8 JTU. The filtrate was recirculated through Filter 1 three times after which the turbidity values were 0.37 and 0.4, respectively.

EXAMPLE 3

Unstable rum based liquor samples were passed through selected filter media and turbidity was measured of the effluent sample. Results are recorded below in Table III.

TABLE III

| | N.T.U. |
|---|---|
| Untreated | 0.55 |
| Filter A | 0.46 |
| Filter B | 0.70 |
| Filter C | 0.40 |
| Filter D | 0.35 |

Filter A = cationic melamine-formaldehyde resin modified silica-cellulose filter.
Filter B = Filter 2 in Example 1.
Filter C = Filter 3 in Example 1.
Filter D = anionic silica-cellulose filter.

Only Filter B caused haze formation, the remaining merely filtering haze present in the untreated samples.

EXAMPLE 4

A quantity of unstabilized whiskey was filtered through Filter 2 (EXAMPLE 1) at room temperature (i.e., about 70° F.) at the rate of 620 ml/mm sin disc and 15 psi pressure. The turbidity of unstabilized whiskey was 1.9 NTU, and the stabilized product had a turbidity of 8.0 NT.

A like quantity of the same unstabilized whiskey was chill-hazed by cooling to 50° F. to obtain stabilized product of a turbidity of 4.6 NTU.

Filtration of both stabilized products which was carried out at about the temperature at which the haze was formed with an asbestos filter brought the turbidity of the products to a typical level of 0.4 NTU.

The product stabilized in accordance with the invention after 2.5 months at 50° F. showed an NTU of 1.4 and the chill-stabilized product, 2.6.

What is claimed is:

1. A process for removal of haze precursors from unstable beverages which comprises the step of contacting said beverage in a haze-free condition and at ambient temperature with a positive-charge modified porous medium comprised of fine particulate, the charge being modified with a polyamido-polyamine epichlorhydrin cationic resin, to form a precipitate and removing said precipitate from said beverage at ambient temperature.

2. The process of claim 1 wherein the beverage is contacted in a haze-free condition with the positive-charge modified porous medium at a temperature within the range of from about 50° F. to about 75° F. and the resulting precipitate is removed at a temperature within the aforesaid range.

3. A process of stabilizing unstable beverages against haze development which comprises conducting said beverage in a haze-free condition and at ambient temperature through a first filter medium to form haze in said beverage and thereafter filtering the formed haze at ambient temperature with a second filter medium; said first filter medium being comprised of fine particulate and a self-bonding matrix of cellulose fiber, the surfaces of at least one of which are modified with a polyamido-polyamine epichlorhydrin cationic resin to provide a positive Zeta potential, the matrix incorporating beaten cellulose fiber to provide a Canadian Standard Freeness of less than 600 ml.

4. The process of claim 3 wherein the beverage is conducted in a haze-free condition through the first filter medium at a temperature within the range of from about 50° F. to about 75° F. and the resulting haze is filtered through the second filter medium at a temperature within the aforesaid range.

5. The process according to claim 3 wherein said first filter medium comprises from about 1 to about 3 percent by weight of said cationic resin.

6. The process according to claim 3 wherein said first filter medium comprises at least 50 percent by weight of diatomaceous earth.

7. The process according to claim 3 wherein said fine particulate comprises an admixture of diatomaceous earth and perlite.

8. The process according to claim 3 wherein said fine particulate exhibits an average particulate dimension of less than 10 microns.

9. The process according to claim 3 wherein said first filter medium is sanitized or sterilized.

10. The process according to claim 3 wherein said first filter medium is hot water flushed prior to the step of conducting.

11. The process according to claim 3 wherein said beverage is an alcoholic beverage.

12. The process according to claim 3 wherein said beverage is straight or blended whiskey, or rum.

13. The process of precipitating haze precursors from an alcoholic beverage which comprises contacting said beverage in a haze-free condition and at ambient temperature with a positive charge-modified porous medium comprised of fine particulate, the charge being modified with a polyamidopolyamine epichlorhydrin cationic resin.

14. The process of claim 13 wherein the beverage is contacted in a haze-free condition with the positive charge-modified porous medium at a temperature within the range of from 50° F. to about 75° F. to precipitate the haze precursors.

15. The process of claim 14 wherein the precipitated haze precursors are removed from the beverage at or about the temperature at which the haze precursors are precipitated.

* * * * *